US012649071B2

(12) United States Patent
Fayle

(10) Patent No.: US 12,649,071 B2
(45) Date of Patent: Jun. 9, 2026

(54) HARNESS LEG LOOP

(71) Applicant: Amer Sports Canada Inc., North Vancouver (CA)

(72) Inventor: Thomas W.C. Fayle, North Vancouver (CA)

(73) Assignee: Amer Sports Canada, Inc., North Vancouver (CA)

( * ) Notice: Subject to any disclaimer, the term of this patent is extended or adjusted under 35 U.S.C. 154(b) by 502 days.

(21) Appl. No.: 18/130,259

(22) Filed: Apr. 3, 2023

(65) Prior Publication Data

US 2024/0325797 A1 Oct. 3, 2024

(51) Int. Cl.
*A62B 35/00* (2006.01)

(52) U.S. Cl.
CPC ...... *A62B 35/0025* (2013.01); *A62B 35/0012* (2013.01)

(58) Field of Classification Search
CPC ............ A62B 35/0025; A62B 35/0012; A62B 35/0018; A41F 3/00; A63B 29/02
USPC ........................................................ 182/3–9
See application file for complete search history.

(56) References Cited

U.S. PATENT DOCUMENTS 2,344,031 A * 3/1944 Alphonse ........... A62B 35/0031 182/6
3,263,289 A 8/1966 LaGarde
3,450,810 A 6/1969 LaGarde
4,121,688 A 10/1978 Lirakis
4,632,217 A 12/1986 Markwell et al.
4,687,074 A 8/1987 Green
4,712,513 A 12/1987 Huppertsberg
5,145,027 A 9/1992 Petzl et al.
5,433,289 A 7/1995 O'rourke
5,487,444 A 1/1996 Dennington
5,615,750 A 4/1997 Phillips
5,957,091 A 9/1999 McDonald et al.
5,988,315 A 11/1999 Crane
6,283,248 B1 * 9/2001 Groover ............. A62B 35/0025 182/7
6,367,582 B1 4/2002 Derby
6,431,313 B1 * 8/2002 Petzl .................. A62B 35/0025 119/857
6,874,596 B2 4/2005 Zeissler et al.
7,066,181 B2 * 6/2006 West ...................... A61H 3/008 128/869
7,445,085 B2 11/2008 Petzl et al.
7,490,510 B2 2/2009 Agami et al.
7,490,610 B2 * 2/2009 Franklin ............ A62B 35/0025 128/869
7,743,885 B2 6/2010 Martin et al.
(Continued)

FOREIGN PATENT DOCUMENTS

EP 3006089 4/2016
EP 3111998 1/2017
(Continued)

*Primary Examiner* — Muhammad Ijaz
(74) *Attorney, Agent, or Firm* — Terence P. O'Brien; Todd A. Rathe

(57) ABSTRACT

A harness leg loop is provided to receive a thigh, above a knee, of a person wearing the harness. The leg loop may include a thigh support band that includes an outer thigh end portion and an inner thigh end portion. The inner thigh end portion is shaped to extend towards the knee when the leg loop is receiving the thigh.

10 Claims, 8 Drawing Sheets

(56) References Cited

U.S. PATENT DOCUMENTS 8,025,192 B2 9/2011 Petzl et al.
8,056,675 B2 * 11/2011 Helms ................ A62B 35/0018 182/134
8,292,029 B2 10/2012 Martin
8,333,262 B1 12/2012 Carpenter et al.
9,003,617 B2 4/2015 Walker et al.
10,143,865 B2 12/2018 Franke et al.
10,143,965 B1 12/2018 Gunugunuri et al.
10,646,025 B2 5/2020 Koren
10,675,490 B2 * 6/2020 Blondeau ........... A62B 35/0025
10,933,260 B2 * 3/2021 Nance ................ A62B 35/0012
11,311,755 B2 * 4/2022 Blondeau ........... A62B 35/0031
11,477,966 B2 * 10/2022 Rovang ................ A01K 27/002
2007/0209869 A1 * 9/2007 Martin ................. D03D 15/587 182/6
2008/0229558 A1 * 9/2008 Martin ............... A62B 35/0037 24/455
2011/0284321 A1 * 11/2011 Hall ................... A62B 35/0025 182/3
2016/0044975 A1 2/2016 Linden et al.
2016/0096044 A1 * 4/2016 Franke ............... A62B 35/0025 57/22
2016/0344437 A1 11/2016 Gordon
2017/0074351 A1 3/2017 Benavidez et al.
2018/0289084 A1 10/2018 Li
2020/0009411 A1 1/2020 Antonio
2020/0108294 A1 * 4/2020 Nance ................ A62B 35/0031
2021/0023400 A1 * 1/2021 Musakaev ................ A47C 1/00
2021/0038929 A1 2/2021 Vitt et al.
2021/0178200 A1 6/2021 Power et al.
2022/0305307 A1 * 9/2022 McCurley .......... A62B 35/0031
2023/0173312 A1 * 6/2023 Gregoire, Jr. ...... A62B 35/0012 182/9
2023/0270186 A1 * 8/2023 McAdams ......... A62B 35/0075 2/300
2024/0325797 A1 * 10/2024 Fayle ................. A62B 35/0025
2024/0416158 A1 * 12/2024 Bouquier ........... A62B 35/0018
2024/0416159 A1 * 12/2024 Bouquier ........... A62B 35/0018
2025/0032827 A1 * 1/2025 Lee .................... A62B 35/0025
2025/0178792 A1 * 6/2025 Mah ......................... A41D 1/08

FOREIGN PATENT DOCUMENTS

GB 2283935 5/1995
WO WO9111318 8/1991

* cited by examiner

HARNESS LEG LOOP

BACKGROUND

Harnesses may have a variety of different sizes, shapes and configurations. Harnesses may be used for positioning, suspension and fall protection. Harnesses may be used for activities such as climbing, zip lining, bungee jumping and hunting or wildlife observation. During hunting (or wildlife observation) the hunter may use a harness to suspend himself or herself from a tree or other supporting structure.

Such harnesses may include leg or thigh straps or bands that form leg loops which extend or at least partially wrap about the upper legs or thighs of the person wearing the harness. The leg loops are generally suspended from a waist belt. Some harnesses comprise full body harnesses and additionally include straps that extend about the shoulders of the person wearing the harness.

Figure 1:
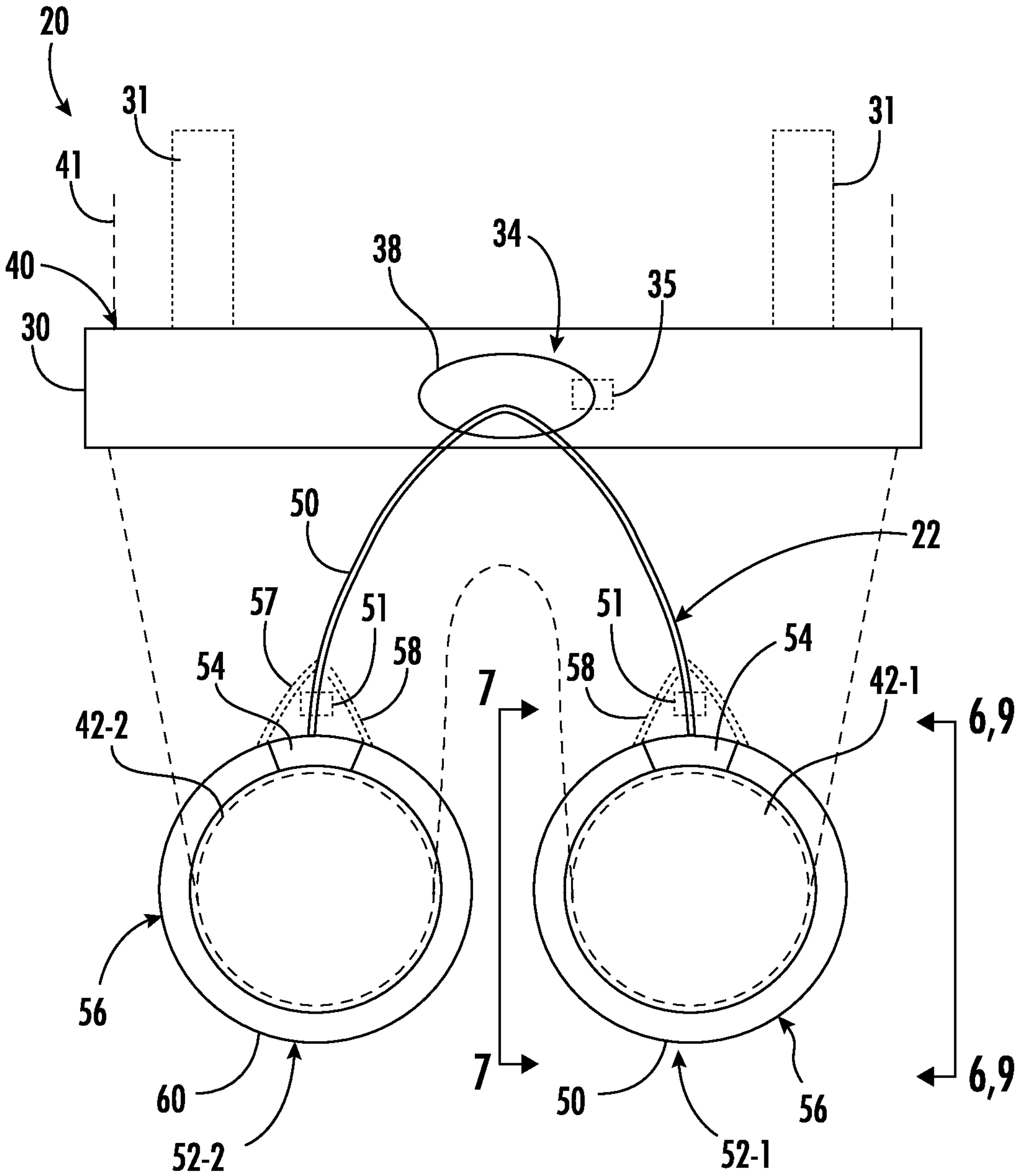
FIG. 1 is a front view illustrating portions of an example harness being worn by a person.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are examples of harness leg loops, harness leg support systems, and harnesses. In some implementations, the example harness leg loops may be interchangeably or releasably coupled to a front link which is fixedly or releasably coupled to a waist belt of a harness. The example harness leg support systems additionally comprise the front link interconnecting the two example leg loops. The harness additionally comprises the waist belt. In some implementations, the harness may additionally comprise shoulder straps or support extending upwards from the waist belt.

The example harness leg loops each comprise a thigh band that wraps at least partially about a thigh of a leg of a person wearing a harness. The thigh support band has an inner thigh end portion that is shaped (without any deformation, twisting, or bending of the band) so as to angle, turn, bend or otherwise extend towards a knee of the person when the loop is receiving the thigh. Because the inner thigh end portion extends towards the knee when the loop is receiving the thigh, the thigh support band less likely to pinch against the thigh when under load. As result, the harness leg support system may be more comfortable to the person wearing the harness.

In some implementations the inner thigh end portion of the thigh support band is shaped so as to curve down, towards the knee of the person wearing the harness by a distance of at least 0.5 cm and no greater than 2 cm over the final or terminal 10 to 15 cm of the inner thigh end portion. In some implementations, the inner thigh end portion of the thigh support band is shaped so as to curve down, towards the knee of the person wearing the harness by distance of at least 1 cm over the final or terminal 10 cm of the inner thigh end portion. In other implementations, the inner thigh end portion of the thigh support band may extend in other fashions towards the knee and away from a front of the waist belt of the harness.

In some implementations, the thigh support band has an outer thigh end portion that does not angle, turn, bend or otherwise extend towards the knee of the person when the loop is receiving the thigh. In some implementations, outer thigh end portion extends along an axis that is coextensive with a centerline along which a central portion of the thigh support band extends. In some implementations, the outer thigh end portion is angled, turns, bends or otherwise extends away from the knee of the person when the loop is receiving the thigh, towards the hips or waist of the person wearing the harness.

The example harness leg support systems comprise a pair of the example leg loops interconnected by a front link that is configured to be connected to a belay loop of a waist belt. The front link may slidably pass through a ring or loop serving as the belay loop. The front link may be connected to each of the two example leg loops in a variety of fashions. In some implementations, the example leg loops may each comprise a top band extending between and interconnecting ends of the thigh support band. In such implementations, the front link may be directly connected to a center portion of the top band at a midpoint between the ends of the thigh support band.

In some implementations, the example leg loops may each comprise a top band extending between and interconnecting ends of the thigh support band, wherein the front link is forked, comprising a pair of diverging prongs. In such an implementation, a first one of the prongs is connected directly to an outer thigh end portion of the thigh support band or is connected to the top band proximate to the outer thigh end portion of the thigh support band. A second one of the prongs is connected directly to an inner thigh end portion of the thigh support band or is connected to the top band proximate to the inner thigh end portion. In some implementations, the example leg loops may omit the top band, wherein the first and second prongs of the forked front link are directly connected to the outer thigh end portion and the inner thigh end portion, respectively.

The example harnesses may comprise a waist belt, a waist belt tie-in point coupled to a front of the waist belt, a belay loop suspended from the waist belt tie-in point and the example harness leg support system described above. In some implementations, the belay loop may be fixedly or releasably coupled to the waist belt. In implementations where the belay loop is releasably coupled to the waist belt such that the belay loop and the supported front link may be separated from the waist belt, permitting the harness leg support system to be exchanged or to be used with a different waist belt.

For purposes of this disclosure, the term "coupled" shall mean the joining of two members directly or indirectly to one another. Such joining may be stationary in nature or movable in nature. Such joining may be achieved with the two members, or the two members and any additional intermediate members being integrally formed as a single unitary body with one another or with the two members or the two members and any additional intermediate member(s) being attached to one another. Such joining may be permanent in nature or alternatively may be removable or releasable in nature.

For purposes of this disclosure, the phrase "configured to" denotes an actual state of configuration that fundamentally ties the stated function/use to the physical characteristics of the feature proceeding the phrase "configured to".

For purposes of this disclosure, the term "releasably" or "removably" with respect to an attachment or coupling of two structures means that the two structures may be repeatedly connected and disconnected to and from one another without material damage to either of the two structures or their functioning.

FIG. 1 is a front view illustrating portions of an example harness 20 comprising an example harness leg support system 22. Harness 20 may be used for positioning, suspension and fall protection. Harness 20 may be used for activities such as climbing, zip lining, bungee jumping and hunting or wildlife observation. During hunting (or wildlife observation) the hunter may use a harness to suspend himself or herself from a tree or other supporting structure. As will be described hereafter, harness 20 comprises a harness leg support system 22 that has leg loops that offer greater comfort for the person wearing harness 20.

In addition to harness leg support system 22, harness 20 comprises waist belt 30, waist belt tie-in point 34, and belay loop 38. Waist belt 30 comprises a belt configured to wrap about the waistline 40 of a person 41 wearing harness 20. Waist belt 30 supports harness 20 on the person wearing harness 20. In some implementations, as indicated by broken lines, harness 20 may be a full body harness, additionally comprising shoulder supports 31 which are connected to and extend upwardly from waist belt 30, wherein shoulder supports 31 extend across and are supported by the shoulders of the person wearing harness 20. Although not illustrated, waist belt 30 may include additional pouches, pockets, loops, rings and attachment points.

Waist belt tie-in point 34 comprises a structure that connects belay loop 38 to a front central portion of belt 30. In some implementations, waist belt tie-in point 34 comprises a fabric loop (similar to a belt loop, but vertically oriented) on a front portion of belt 30. In some implementations, tie-in point 34 comprises a metal ring or other attachment point. In some implementations the waist belt tie-in point 34 releasably connects to the belay loop 38, permitting the belay loop 38 and the attached harness leg support system 22 to be detached from waist belt 30 for repair, replacement or use on a different waist belt. For example, the waist belt tie-in point 34 may comprise a releasable connector 35 (schematically indicated in broken lines) in the form of a buckle, clip or other releasable connector that permits the belay loop 38 to be detached from belt 30.

Belay loop 38 comprises a loop located at the front center portion of belt 30. In some implementations, belay loop 38 comprises a cord, strap or other non-metal loop or ring. In some implementations, belay loop 38 comprises a metal ring. Belay loop 38 provides a location from which leg support system 22 is suspended and is permitted to pivot, slide or rotate relative to a belt 30. In some implementations, belay loop 38 comprises a carabiner or comprises a strap having ends secured to one another by a buckle, a side release buckle or quick release buckle, permitting a front link of leg support system 22 to be detached from belay loop 38 such that the leg support system may be repaired, replaced or utilized as part of a different harness.

Harness leg support system 22 comprises front link 50 and leg loops 52-1 and 52-2 (collectively referred to as leg loops 52). Front link 50 suspends leg loops 52 from belay loop 38. In the example illustrated, front link 50 comprises an elongate strap that has a central portion that passes through belay loop 38 and that has two opposite end portions coupled to leg loops 52. In some implementations, each of such end portions of front link 50 are fixedly connected to leg loops 52, such as by stitching, welding, fusing, bonding or the like. In some implementations, each of such end portions of front link 50 comprise a releasable connector 51 (shown in broken lines) that releasably connects the front link 50 to the respective leg loops 52 such that leg loops 52 may be disconnected from front link 50 and replaced with a new or differently sized leg loop 52. For example, in some implementations, the opposite end portions of front link 50 may be releasably connected to their respective leg loops 52 by a releasable connectors 51 in the form of quick release or side release buckles, snaps or other actuatable or releasable connectors.

Leg loops 52-1 and 52-2 are configured to receive thighs 42-1 and 42-2, respectively, of the person 41 wearing harness 20. Each of leg loops 52 comprises top band 54 and thigh support band 56. Top band 54 comprise a strap or cord that extends between and is connected to opposite end portions of thigh support band 56.

Figure 2:
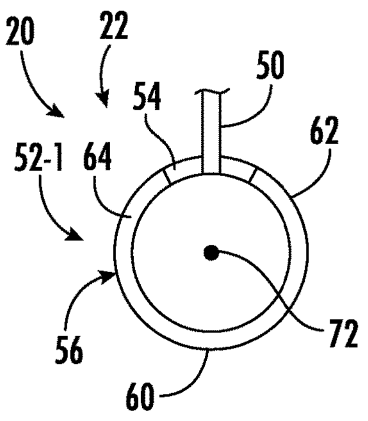
FIG. 2 is a fragmentary enlarged view a portion of the harness of FIG. 1, illustrating an example of how a front link may be attached to a leg loop.

As shown by FIGS. 1 and 2, in the example illustrated, front link 50 is directly connected to top band 54 at a midpoint equally spaced from the opposite end portions of thigh support band 56. In some implementations, front link 50 comprise a loop that encircles a portion of top band 54. In other implementations, front link 50 has an end portion that is fixed to top band 54 by stitching, welding, or the like. As discussed above, in some implementations, top band 54 may include a releasable connector or be releasably connected to front link 50 to facilitate separation of leg loop 52 from front link 50.

Figure 3:
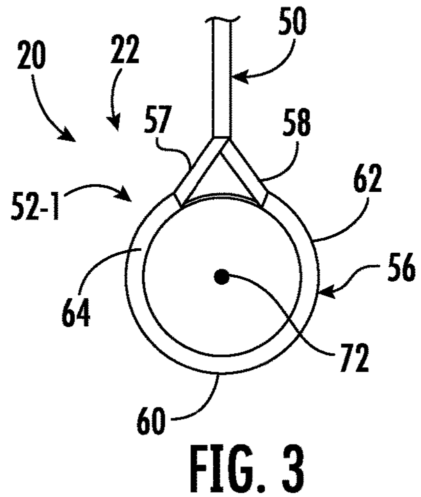
FIG. 3 is a fragmentary enlarged view a portion of the harness of FIG. 1 illustrating an example of how a front link may be attached to a leg loop.
Figure 4:
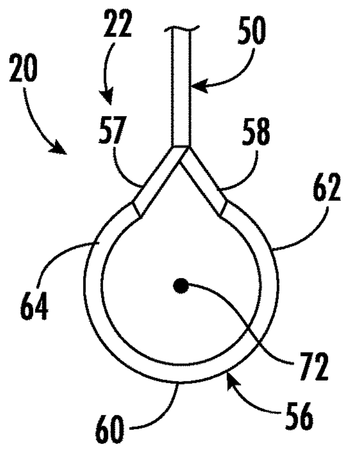
FIG. 4 is a fragmentary enlarged view a portion of the harness of FIG. 1 illustrating an example of how a front link may be attached to a leg loop.

As shown by broken lines in FIG. 1 and by solid lines in FIG. 3, in some implementations, front link 50 may alternatively be forked so as to have a first prong 57 and a second prong 58. Prong 57 is directly connected to an outer thigh end portion of thigh support band 56 or to portions of top band 54 proximate the outer thigh end portion of thigh support band 56. Prong 58 is directly connected to an inner thigh end portion of the thigh support band 56 or to portions of top band 54 proximate the inner thigh end portion of the thigh support band 56. As shown by FIG. 4, in those implementations in which front link 50 is forked and in which prongs 57 and 58 are directly connected to the outer thigh end portions and the inner thigh end portions of the thigh support bands 56, respectively, top band 54 may be omitted.

Thigh support band 56 is configured to extend beneath the particular thigh 42 and upwards along both inner and outer sides of the thigh 42. In some implementations, thigh support band 56 has a width greater than a width of top band 54 (when provided). In some implementations, thigh support band 56 has additional padding provided by a foam or cushion layer. In some implementations, thigh support band 56 has a greater degree of stiffness as compared to the strap or straps forming top band 54.

Figure 5:
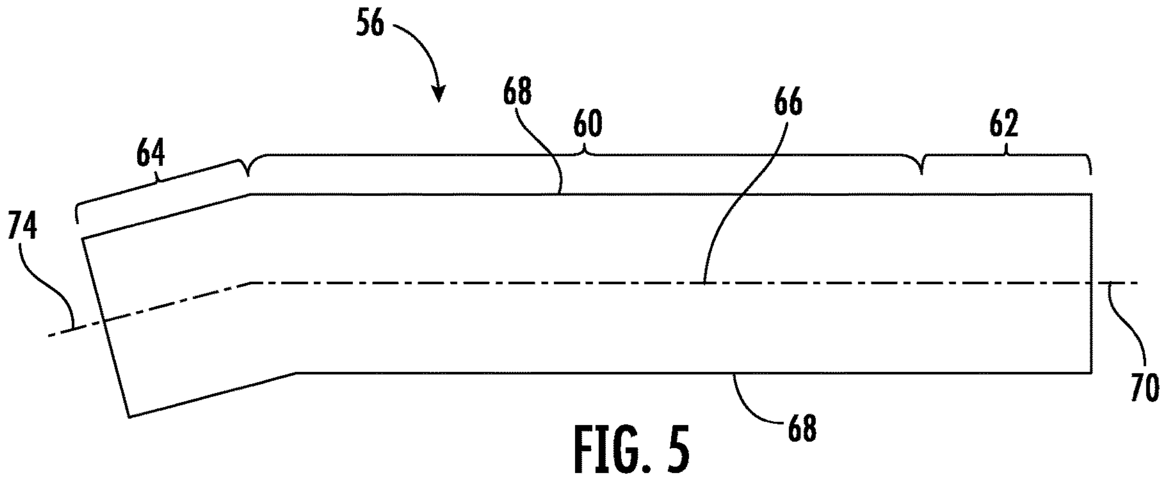
FIG. 5 is a bottom plan view illustrating portions of an example thigh support band of an example leg loop of the harness of FIG. 1.

FIG. 5 illustrates thigh support band 56 in a substantially flattened or spread-out state independent of top band 54, wherein thigh support band 56 is not under any load which might result in thigh support band 56 deforming, bending or twisting. Thigh support band 56 comprises a lower thigh support portion 60, an outer thigh end portion 62, and an inner thigh end portion 64. Lower thigh support portion 60 comprises a central portion of thigh support band 56, extending between outer thigh end portion 62 and inner thigh end portion 64. Lower thigh support portion 60 is configured or located so as to generally extend below the particular thigh 42 of the person 41 wearing harness 20. In the example illustrated, lower thigh support portion 60 extends along an axis which forms a centerline 66 of portion 60. Although the edges 68 of lower thigh support portion 60 are illustrated as being parallel to one another and straight or linear, in other implementations, such edges may be nonparallel to one another and may have other nonlinear or wavy shapes.

Outer thigh end portion 62 comprises an end portion of thigh support band 56 that is to be located along the outer side of the particular thigh 42 when harness 20 is being worn. Outer thigh end portion 62 faces in a direction away from the inner thigh end portions of both of the leg loops and in a direction away from a front center of belt 30. Outer thigh end portion is connected to front link 50. As shown by FIG. 5, outer thigh end portion 62 extends along an axis which forms a centerline 70 of end portion 62. In the example illustrated, centerline 70 is aligned with and coextensive with centerline 66 of lower thigh support portion 60.

Figure 6:
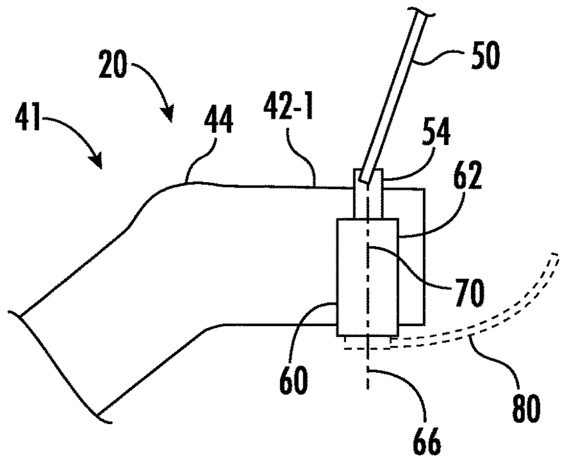
FIG. 6 is a side view of the harness of FIG. 1 being worn and taken along line 6-6.

FIG. 6 is a side view illustrates harness 20 while being worn and taken along line 6-6 of FIG. 1. As shown by FIG. 6, outer thigh end portion 62 extends in a direction substantially perpendicular to the centerline 72 (shown in FIG. 2) of the leg loop 52. Outer thigh end portion 62 does not extend in a direction towards knee 44 of person 41, nor does it extend in a direction towards the torso of person 41. As result, when a person is suspended using harness 20, downward vertical forces exerted upon outer thigh end portion 62 any twisting or bending of outer thigh end portion 62 is reduced or eliminated.

As shown by FIG. 5, inner thigh end portion, extends along an axis which forms a centerline 74 of end portion 64. Centerline 74 is angled and is oblique to centerline 66.

Figure 7:
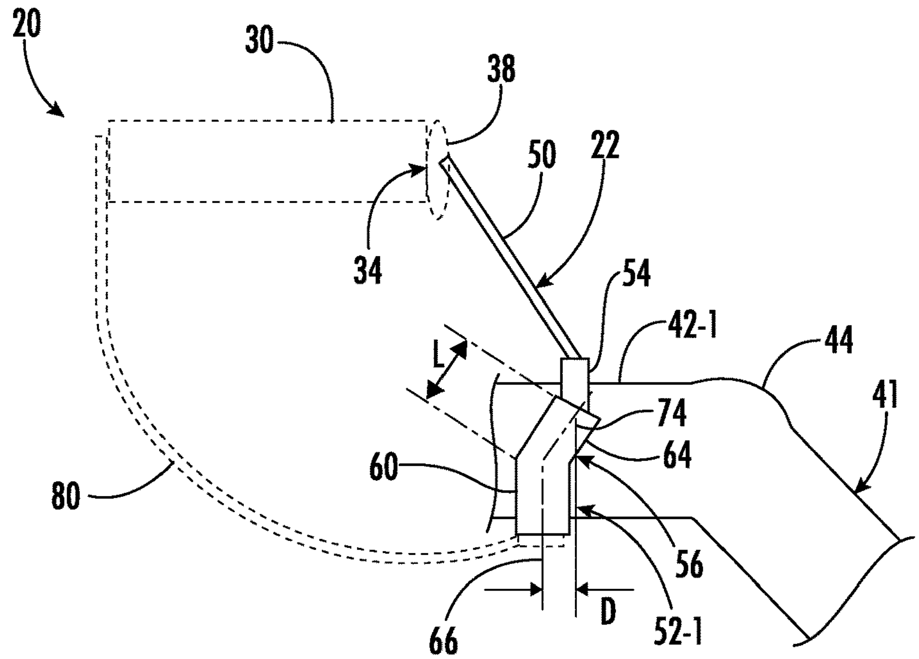
FIG. 7 is a side view of the harness of FIG. 1 being worn and taken along line 7-7.

FIG. 7 is a side view illustrates harness 20 while being worn and taken along line 7-7 of FIG. 1. As shown by FIG. 7, when harness 20 is worn, inner thigh end portion 64 extends in a direction towards knee 44 of person 41, in a direction away from the torso of person 41. Inner thigh and portion 64 faces in a direction towards the inner thigh end portion of the other leg loop and towards a front center of belt 30. Inner thigh end portion 64 extends from a location horizontally offset from or to the left of (as seen in FIG. 7) top band 54 to a location connected to top band 54. Because the inner thigh end portion 64 does not extend along a centerline that is aligned with the centerline of lower thigh support portion 60 and does not extend towards the torso (away from the knee 44), inner thigh end portion 64 is less likely to pinch against the inner thigh of the person wearing harness 20 while the person is being suspended by harness 20 or subjects the inner thigh to a lower amount of any pinching force. In some implementations, during such vertical loading, the inner thigh end portion 64 bends or deforms in an outward direction, away from the inner thigh, to reduce pressure on the inner thigh. As a result, the use of harness 20 and lower leg support system 22 is more comfortable to the person wearing harness 20.

In some implementations, inner thigh end portion 64 extends towards the knee 44 of the person wearing the harness by a distance D (from centerline 66 to centerline 74) of at least 0.5 cm and no greater than 2 cm over the final or terminal distance or length L of 10 to 15 cm of the inner thigh end portion 64. In some implementations, the inner thigh end portion 64 of the thigh support band 64 is shaped to extend towards the knee 44 of the person wearing the harness by distance D of at least 1 cm over the final or terminal length L of 10 cm of the inner thigh end portion 64. In other implementations, the amount and/or rate at which inner thigh end portion 64 is out of alignment with lower thigh support portion 60 or extends towards knee 44 when being worn may vary.

Although inner thigh end portion 64 is illustrated as being linearly angled relative to lower thigh support portion 60, linearly extending at an angle from lower thigh support portion 60, in other implementations, inner thigh end portion 64 may extend in other nonaligned manners from lower thigh support portion 60. For example, inner thigh end portion 64 may alternatively have a rounded or curved shape so as to curve towards knee 44 when being worn (and prior to any vertical loading or downward force being exerted upon the particular leg loop 52). Although inner thigh end portion 64 is illustrated as having substantially the same width as lower thigh support portion 60 and outer thigh end portion 62, in other implementations, inner thigh end portion 64 may have a width that differs from one or both of lower thigh support portion 60 and outer thigh end portion 62. Although inner thigh end portion 64 is illustrated as having a width greater than that of top band 54, in other implementations, inner thigh end portion 64 may have a width equal to or greater than that of top band 54.

As further shown by FIG. 7, in some implementations, harness 20 may additionally comprise rear links 80, one of which is shown. Rear links 80 comprise elongate flexible cords or straps that extend between each of the leg loops 52 and a rear side of waist belt 30. Each of rear links 80 extends from a lower outer side or back edge of its respective leg loop 52, being connected to thigh port band 56.

Figure 8:
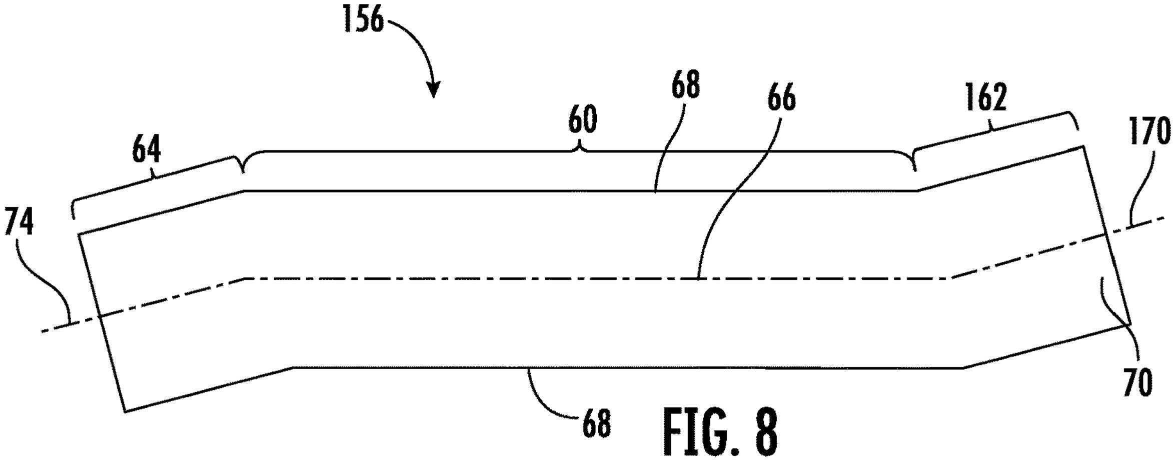
FIG. 8 is a top view illustrating portions of an example thigh support band of an example leg loop of an example harness.
Figure 9:
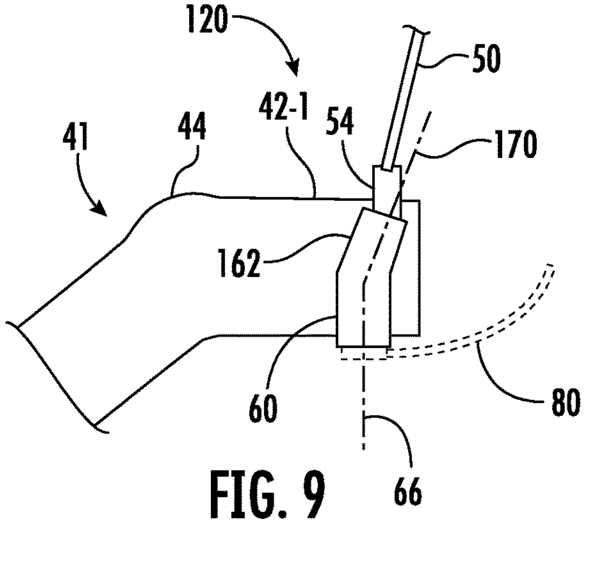
FIG. 9 is a side view illustrating the example harness similar to the harness of FIG. 6 but including the example thigh support band of FIG. 8.

FIGS. 8 and 9 illustrate portions of an example harness 120. FIGS. 8 and 9 illustrate an alternative shape for the thigh support bands which form the two leg loops of harness 120. Harness 120 is similar to harness 20 described above except that each of the leg loops 52 of harness 120 comprise the illustrated thigh support band 156 in place of the prior described support band 56. Those remaining components of harness 120 which correspond to components of harness 20 are numbered similarly and/or are illustrated and described above with respect to harness 20.

As shown by FIG. 8, thigh support band 156 is similar to thigh support band 56 (shown and described above with respect to FIG. 4) except that thigh support band 156 comprises outer thigh end portion 162 in lieu of outer thigh end portion 62. Outer thigh end portion 162 extends along an axis that forms a centerline 170 of outer thigh ends portion 162. Centerline 170 is oblique to centerline 66 and extends in a direction opposite to that of centerline 74. Centerline 170 extends at an upwards angle while centerline 74 extends at a downward angle. As result, thigh support band 156 has an asymmetric shape.

FIG. 9 is a side view illustrates harness 120 while being worn and taken along line 9-9 of FIG. 1. As shown by FIG. 9, outer thigh end portion 162 extends in a direction away from knee 44, towards the torso of person 41, when the harnesses 20 is being worn and the legs are horizontal or angled in a forward direction from the torso (as seen in FIG. 9).

FIGS. 10-13 illustrate portions of an example harness 220 being worn by a person 41 (shown in broken lines). FIGS. 10-13 illustrate a specific example implementation of the harness 20 schematically shown in FIGS. 1-7. Similar to harness 20, harness 220 comprises waist belt 230, waist belt tie-in point 234, belay loop 238 and harness leg support system 322.

Waist belt 230 comprises a belt configured to wrap about the waistline 40 of a person 41 wearing harness 220. Waist belt 230 has an adjustable length, wherein portions of belt 230 overlap one another along the front of the person wearing belt 230. The length of waist belt 230 is adjustable using buckle 237.

Waist belt 230 supports harness 220 on the person wearing harness 220. In some implementations, as indicated by broken lines in FIG. 1, harness 220 may be a full body harness, additionally comprising shoulder supports 31 which are connected to and extend upwardly from waist belt 230, wherein shoulder supports 31 extend across and are supported by the shoulders of the person wearing harness 220. As shown by FIG. 9, waist belt 230 may include additional pouches/pockets 231, loops 232, or other attachment points.

Waist belt tie-in point 234 comprises a structure that connects belay loop 238 to a front central portion of belt 230. In the example illustrated, waist belt tie-in point 234 comprises a fabric strap 235 stitched or otherwise secured to a front of waist belt 230 at both end portions, forming horizontally oriented loop having an upwardly facing passage on a front face of belt 230. In other implementations, strap 235 may have an end that is releasably connected to the front of waist belt 230, permitting belay loop 238 and leg support system 322 to be separated from belt 230. In some implementations, tie-in point 234 may alternatively comprise a metal ring or other attachment point.

Belay loop 238 comprises a loop located at the front center portion of belt 230. In the example illustrated, belay loop 238 comprises a flexible fabric or polymeric cord, strap or other non-metal loop or ring. In other implementations, belay loop 238 comprises a metal ring or carabiner. Belay loop 238 provides a location from which leg support system 322 is suspended and is permitted to pivot, slide or rotate relative to a waist belt 230.

Harness leg support system 322 comprises front link 350, rear link 351, and leg loops 352-1 and 352-2 (collectively referred to as leg loops 352). Front link 350 suspends leg loops 352 from belay loop 238. In the example illustrated, front link 350 comprises outer strap 402, inner strap 404, sleeve 406 and restrictor 408.

Outer strap 402 comprises an elongate cord or strap having a central portion passing through belay loop 238 and opposite end portions affixed to outer thigh end portions 362 of leg loops 352. Inner strap 404 comprises an elongate cord or strap having a central portion passing through belay loop 238 and opposite end portions affixed to inner thigh end portions 364 of leg loops 352. Sleeve 406 comprises a tube through which straps 402 and 404 extend. Sleeve 406 passes through belay loop 238. In some implementations, sleep 46 may be formed from a more robust or abrasion resistant material as compared to strap 402, 404. In some implementations, sleeve 406 is affixed to one or both of strap 402, 404 by adhesives, welding, stitching or the like.

Restrictor 408 comprises one or more straps that bridge below belay loop 238 to restrict upward movement of harness leg support system 322 and to retain harness leg support system 322 on belay loop 238.

In some implementations, restrictor 408 comprises individual straps that connect portions of straps 402 and/or 404 on one side of belay loop 238 to portions of strap 402 and/or 404 and opposite side of belay loop 238. In some implementations, restrictor 408 may be provided by a pair of individual straps. Restrictor 408 may have ends releasably connected to one another by a hook and loop fastener 410. In some implementations, restrictor 408 may be provided by a single flexible strap fixed or secured to straps 402 and 404. In some implementations, restrictor 408 may comprise a single strap that passes through sleeve 406 and which has ends secured to another in a fixed manner, such as by stitching, or in a releasable manner such as with a snap, button, class, hook or hook and loop fastener (VELCRO™). In some implementations, restrictor 408 may be omitted.

Figure 10:
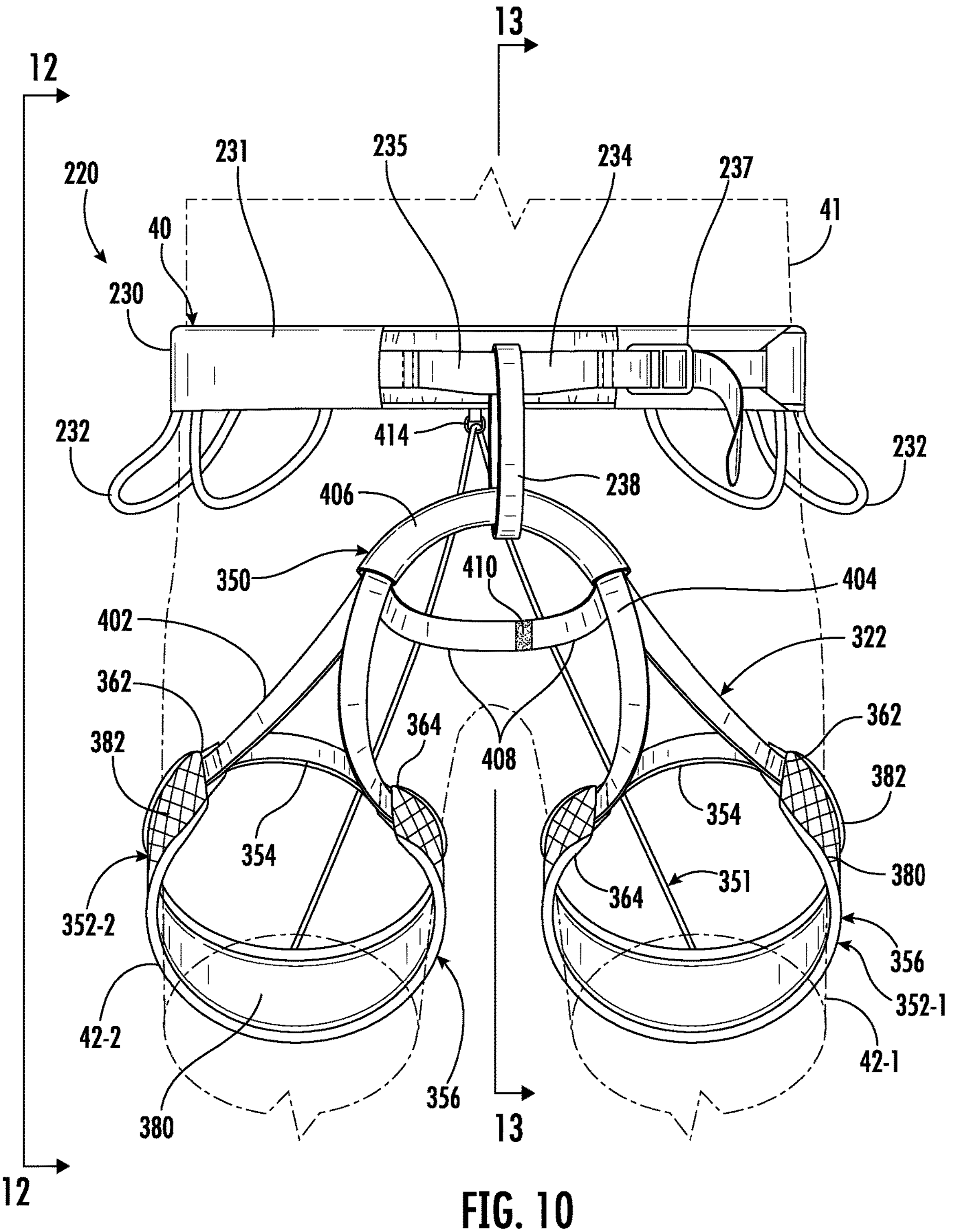
FIG. 10 is a front view illustrating portions of an example harness being worn by a person.

As shown by FIG. 10, front link 350 is connected to each of leg loops 352 in a manner similar to that shown and described above with respect to FIG. 3. In other implementations, front link 350 may be connected to leg loops 352 in a manner similar to that shown and described above with respect to FIG. 2 or in a manner similar to that shown and described above with respect to FIG. 4. In yet other implementations, front link 350 may have other configurations for connection to leg loops 352.

Rear link 351 comprises one or more cords or straps having a first end portion secured to back or rear ends of leg loops 352 and a second end portion secured to a back or rear end of waist belt 230. In the example illustrated, rear link 351 comprise a single cord that pass through a ring 414 affixed to a rear side of waist belt 30, wherein the single cord has opposite ends affixed to the bottoms of leg loops 352-1, 352-2. In other implementations, rear link 351 comprise two separate straps, wherein each strap has a first end affixed to a rear of waist belt 230 and a second end affixed to the bottom of a respective one of leg loops 352. In some implementations, rear link 351 may be omitted.

Leg loops 351-1 and 352-2 are substantially identical to one another. Leg loops 352-1 and 352-2 are configured to receive thighs 42-1 and 42-2, respectively, of the person 41 wearing harness 220. Each of leg loops 352 comprises top band 354 and thigh support band 356. Top band 354 interconnects thigh support band 356 to front link 350. Top band 354 extends between and is connected to opposite end portions of thigh support band 356. In some implementations top band 354 comprises a flexible inelastic band of woven fabric (textile) or a band of polymeric materials. In some implementations, top band 354 comprises flexible elastic band of stretchable fabric, stretchable rubber, or stretchable rubber-like materials.

Figure 11:
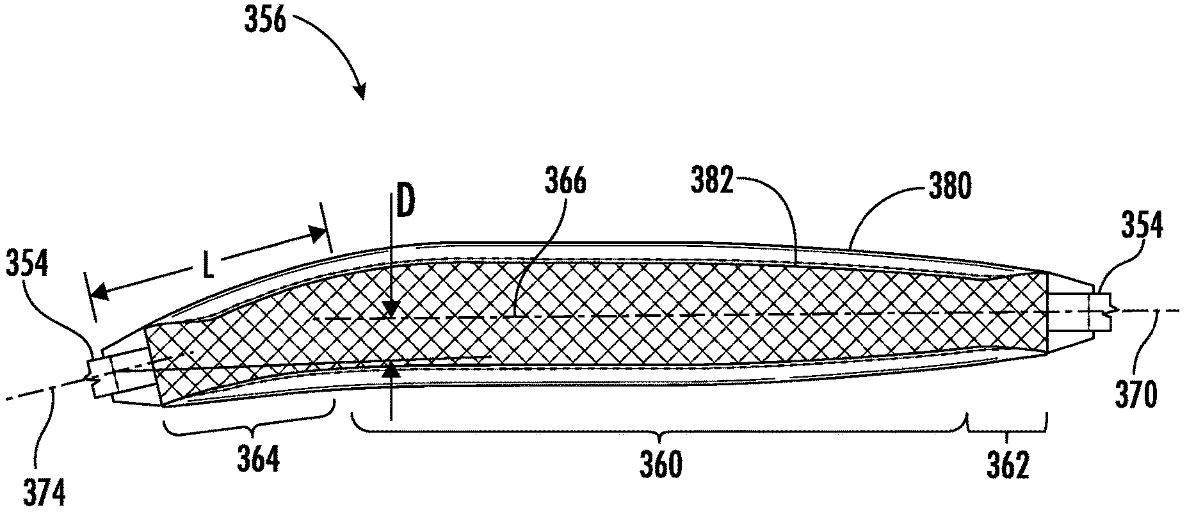
FIG. 11 is a bottom view of an example leg loop of the harness of FIG. 10 with an example thigh support band of the leg loop being spread out and not under any load.

Thigh support band 356 is configured to extend beneath the particular thigh 42 and upwards along both inner and outer sides of the thigh 42. FIG. 11 illustrates thigh support band 356 in a substantially flattened or spread-out state, wherein thigh support band 56 is not under any load which might result in thigh support band 356 deforming, bending or twisting. In the example illustrated, thigh support band 356 comprises a flexible, soft, compressible padding layer 380 and a flexible elastic backing layer 382. Padding layer 380 may comprise one or more layers of soft compressible foam. The flexible elastic backing layer 382 may comprise elastic yarns stitching backing layer 382 to padding layer 380 in a diagonal crossing pattern. In other implementations, thigh support band 356 may be formed from a greater or fewer of such layers and such layers may be formed from different materials or have different compositions.

In the example illustrated, thigh support band 356 has a width greater than a width of top band 354. In some implementations, thigh support band 356 has a greater degree of stiffness as compared to the strap or straps forming top band 354. As noted above, in some implementations, top band 354 may be omitted where front link 350 is directly connected to end portions of thigh support band 356, such as being directly connected to backing layer 382 at the opposite ends of thigh support band 356.

As further shown by FIG. 11, thigh support band 356 comprises a lower thigh support portion 360, an outer thigh end portion 362, and an inner thigh end portion 364. Lower thigh support portion 360 comprises a central portion of thigh support band 356, extending between outer thigh end portion 62 and inner thigh end portion 64. Lower thigh support portion 360 is configured or located so as to generally extend below the particular thigh 42 of the person 41 wearing harness 220. In the example illustrated, lower thigh support portion 60 extends along an axis which forms a centerline 366 of portion 360.

Outer thigh end portion 362 comprises an end portion of thigh support band 356 that is to be located along the outer side of the particular thigh 42 when harness 220 is being worn. Outer thigh end portion 362 is connected to front link 350. As shown by FIG. 11, outer thigh end portion 362 extends along an axis which forms a centerline 370 of end portion 362. In the example illustrated, centerline 370 is aligned with and coextensive with centerline 366 of lower thigh support portion 360.

Figure 12:
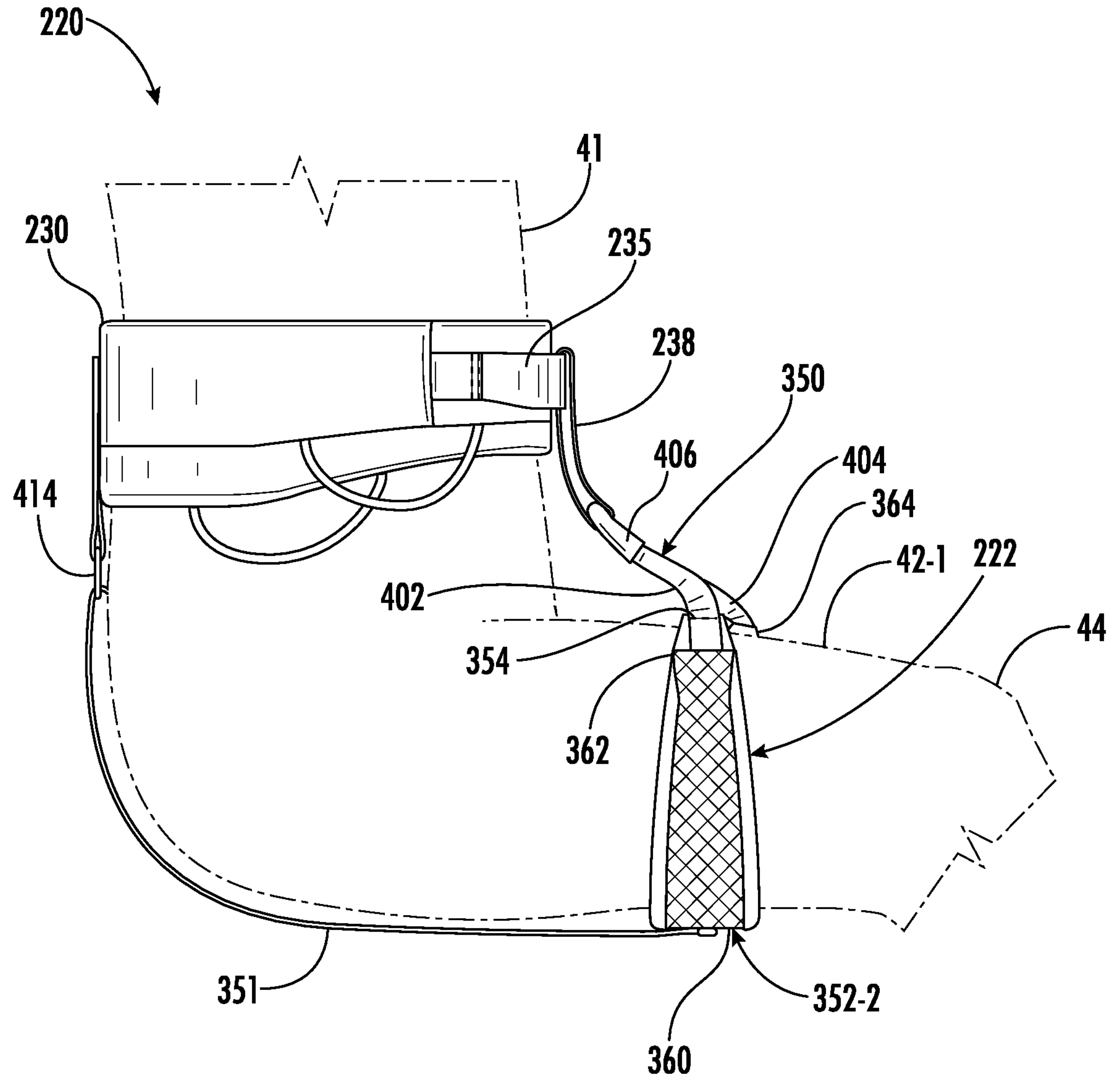
FIG. 12 is a side view of the example harness of FIG. 10 taken along line 12-12.

FIG. 12 is a side view illustrates harness 220 while being worn and taken along line 12-12 of FIG. 10. As shown by FIG. 12, outer thigh end portion 362 extends in a direction substantially perpendicular to the centerline 372 (shown in FIG. 2) of the leg loop 352-2. Outer thigh end portion 362 does not extend in a direction towards knee 44 of person 41, nor does it extend in a direction towards the torso of person 41. As result, when a person is suspended using harness 220, downward vertical forces exerted upon outer thigh end portion 362 any twisting or bending of outer thigh end portion 362 is reduced or eliminated.

As shown by FIG. 11, inner thigh end portion, extends along an axis which forms a centerline 374 of end portion 364. Centerline 374 is angled and is oblique to centerline 66.

Figure 13:
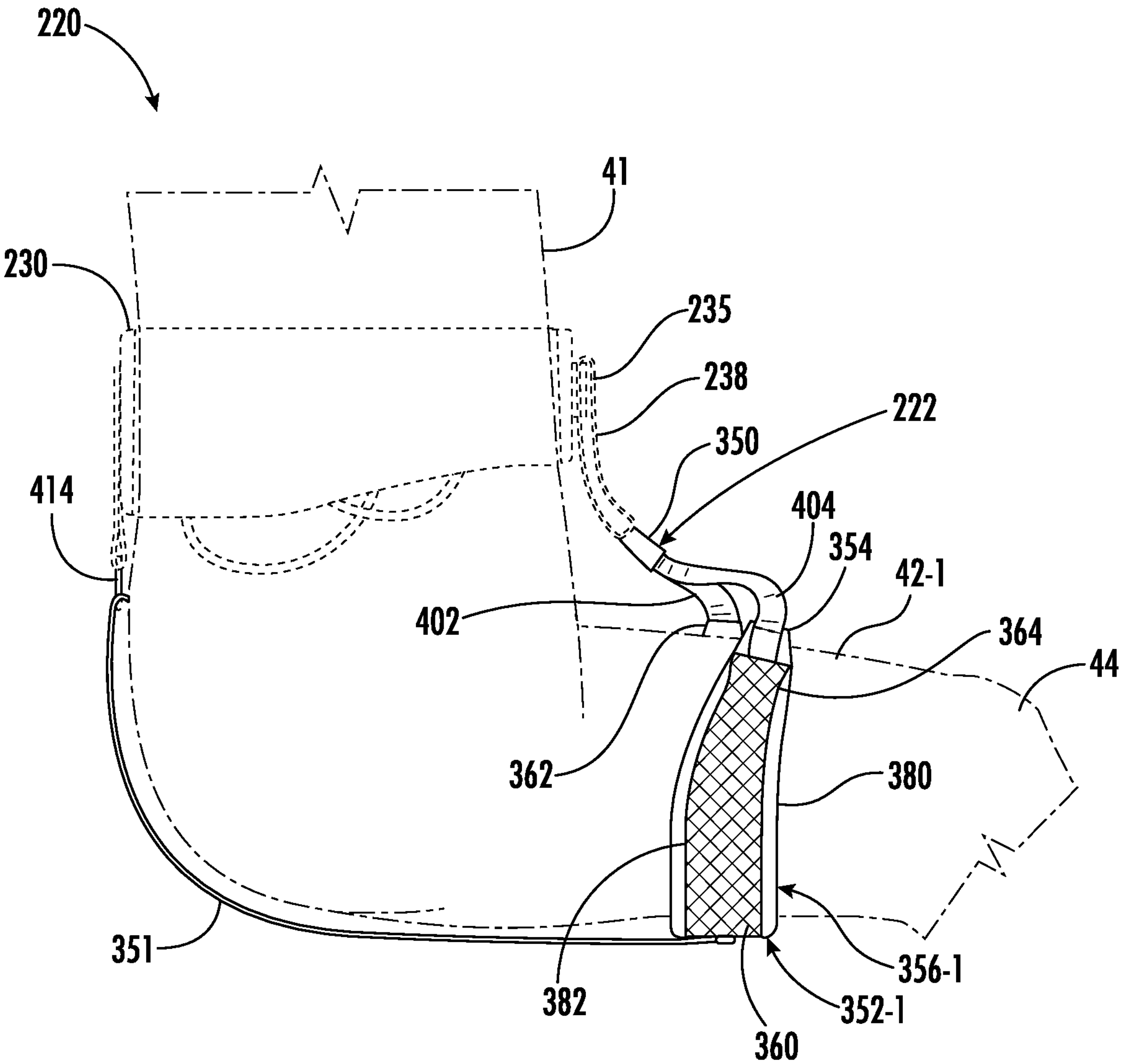
FIG. 13 is a side view of the example harness of FIG. 10 taken along line 13-13.

FIG. 13 is a side view illustrating harness 220 while being worn and taken along line 13-13 of FIG. 10. As shown by FIG. 13, when harness 220 is worn, inner thigh end portion 364 extends in a direction towards knee 44 of person 41, in a direction away from the torso of person 41. Inner thigh end portion 364 extends from a location horizontally offset from or to the left of (as seen in FIG. 13) top band 354 to a location connected to top band 54. Because the inner thigh end portion 364 does not extend along a centerline that is aligned with the centerline of lower thigh support portion 360 and does not extend towards the torso (away from the knee 44), inner thigh end portion 364 is less likely to pinch against the inner thigh of the person wearing harness 220 while the person is being suspended by harness 220 or subjects the inner thigh to a lower amount of any pinching force. In some implementations, during such vertical loading, the inner thigh end portion 364 bends or deforms in an outward direction, away from the inner thigh, to reduce pressure on the inner thigh. As a result, the use of harness 220 and lower leg support portion 222 is more comfortable to the person wearing harness 220.

In some implementations, inner thigh end portion 364 extends towards the knee 44 of the person wearing the harness by a distance D (from centerline 366 to centerline 374 at the end of portion 364) of at least 0.5 cm and no greater than 2 cm over the final or terminal distance or length L of 10 to 15 cm of the inner thigh end portion 364. In some implementations, the inner thigh end portion 364 of the thigh support band 364 is shaped to extend towards the knee 44 of the person wearing the harness by distance D of at least 1 cm or the final or terminal length L of 10 cm of the inner thigh end portion 364. In other implementations, the amount and/or rate at which inner thigh end portion 364 is out of alignment with lower thigh support portion 360 or extends towards knee 44 when being worn may vary.

Although inner thigh end portion 364 is illustrated as curving relative to lower thigh support portion 360, in other implementations, inner thigh end portion 364 may linearly extend at an angle from lower thigh support portion 360. Although inner thigh end portion 364 is illustrated as tapering towards its ends, in other implementations, thigh support band 356 may have a uniform width along its length.

Figure 14:
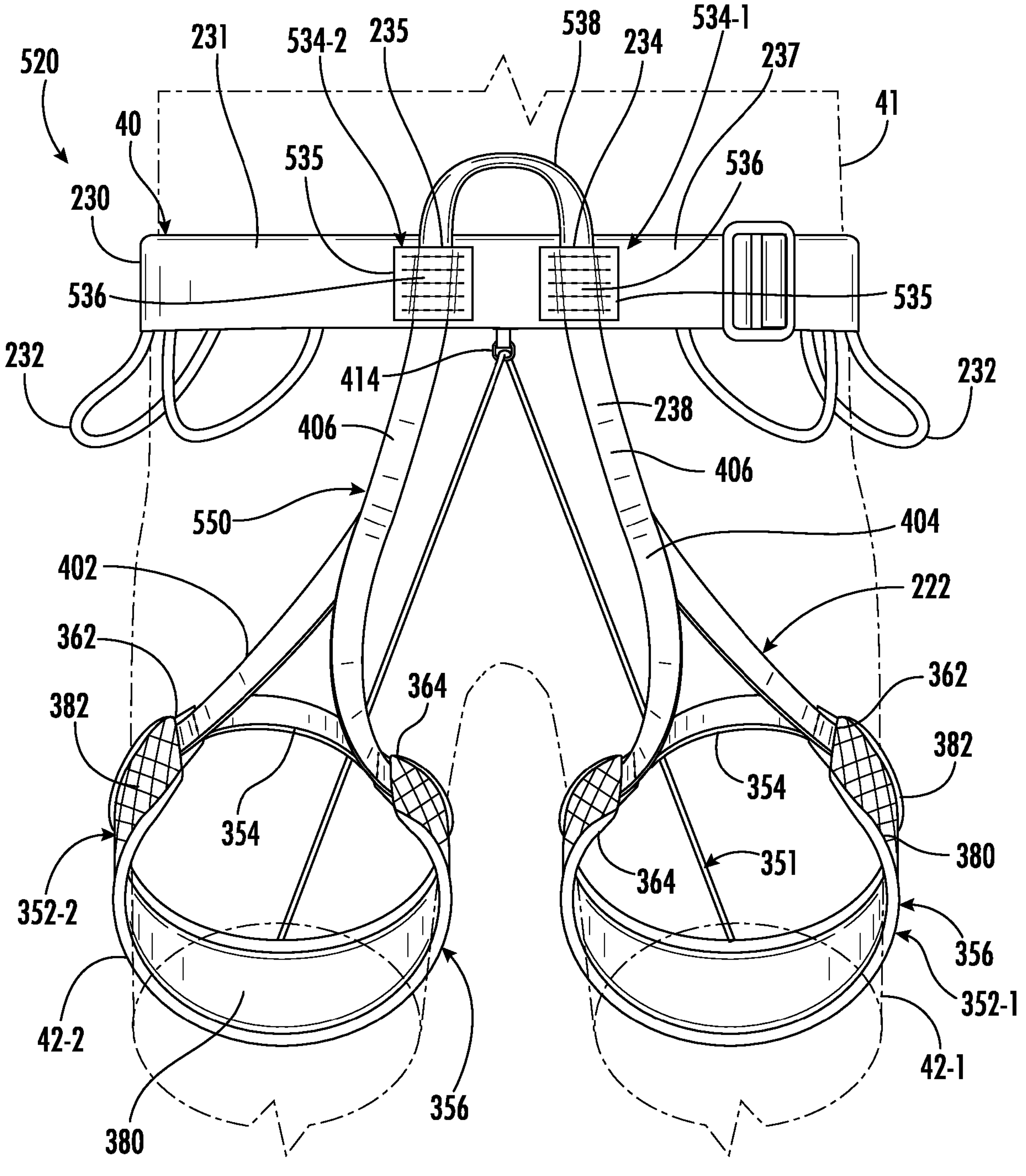
FIG. 14 is a front view illustrating portions of an example harness being worn by a person.

FIG. 14 is a front view illustrating portions of an example harness 520 being worn by a person 41. FIG. 14 illustrates an example of how the above-described leg loops may be provided on harnesses having other configurations, such as where the leg loops are individually and independently coupled to the waist belt at two locations. Harness 520 is similar to harness 220 described above except that harness 520 omits waist belt tie-in point 234 and belay loop 238 and comprises belay loop 538 and harness leg support system 522. Those remaining components of harness 520 which correspond to components of harness 220 are numbered similarly.

Belay loop 538 comprises a loop located at the front center portion of belt 230. In the example illustrated, belay loop 538 comprises a flexible fabric or polymeric cord, strap or other non-metal loop or ring attached to waist belt 230 and projecting above or in front of waist belt 230. In other implementations, belay loop 538 comprises a metal ring or carabiner. Belay loop 538 provides a location to which a belay device (such as a belay carabiner) may be releasably connected while being permitted to pivot, slide or rotate relative to a waist belt 230.

Harness leg support system 522 is similar to harness leg support 322 except that each of the individual leg supports are individually connected to waist belt 230 at separate locations below belay loop 538. Harness leg support system 522 comprises front link 550 in lieu of front link 350. Front link 550 is similar to 350 except that front link 550 omits sleeve 406 and restrictor 408. Instead, outer strap 402 and inner strap 404, extending from leg loop 352-1, merge or are connected to one another by stitching or the like to form strap portion 406 which has an end portion that is connected to waist belt 230 at connection location 534-1. Likewise, outer strap 402 and inner strap 404 extending from leg loop 352-2 merge or are connected to one another by stitching or the like to form strap portion 406 which has an end portion that is connected to waist belt 230 at connection location 534-2 along waist belt 230.

In the example illustrated, a fabric reinforcement panel 535 and stitching 536 is used to secure and connect the single or doubled up strap portion 406 and each of locations 534-1 and 534-2. In other implementations, each of the strap portions 406 may alternatively be connected to waist belt 230 in other fashions. For example, waist belt 230 may be provided with individual rings about which strap portions 406 extend or to which strap portions 406 are connected by other fasteners or attachment mechanisms.

As discussed above, the outer strap 402, the inner strap 404 and the top band 354 associated with each of the leg loops 352 may have other configurations. FIGS. 2, 3 and 4, discussed above, illustrate examples of how leg loops 352 and front link 550 may be configured, except that with respect to harness 520, the upper portions of the front links 50 shown in FIGS. 2, 3 and 4 are instead connected to waist belt 230 at spaced connection locations 524-1 and 524-2.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms “first”, “second”, “third” and so on in the claims merely distinguish different elements and, unless otherwise stated, are not to be specifically associated with a particular order or particular numbering of elements in the disclosure.

What is claimed is:

1. A harness leg support system comprising:
a front link;
a first leg loop to receive a first thigh, above a first knee of a person wearing a harness, the first leg loop comprising:
a first thigh support band comprising:
a first outer thigh end portion coupled to the front link; and
a first inner thigh end portion coupled to the front link, the first inner thigh end portion shaped to extend towards the first knee when the first leg loop is receiving the first thigh; and
a second leg loop to receive a second thigh, above a second knee of the person wearing the harness, the second leg loop comprising:
a second thigh support band comprising:
second outer thigh end portion coupled to the front link; and
a second inner thigh end portion coupled to the front link, the second inner thigh end portion shaped to extend towards the second knee when the second leg loop is receiving the second thigh.

2. The harness leg support system of claim 1 further comprising a top band extending between and interconnecting the outer thigh end portion and the inner thigh end portion.

3. A harness comprising:
a waist belt;
a waist belt tie-in point coupled to a front of the waist belt;
a belay loop suspended from the waist belt tie-in point;
a harness leg support system comprising:
a first leg loop to receive a first thigh, above a first knee of a person wearing the harness, the first leg loop comprising:
a first thigh support band comprising:
a first outer thigh end portion; and
a first inner thigh end portion, the first inner thigh end portion shaped to extend towards the knee when the first leg loop is receiving the first thigh;
a second leg loop to receive a second thigh, above a second knee of the person wearing the harness, the second leg loop comprising:
a second thigh support band comprising:
a second outer thigh end portion; and
a second inner thigh end portion, the second inner thigh end portion shaped to extend towards the second knee when the second loop is receiving the second thigh; and
a front link connected to the belay loop and coupled to the first leg loop and the second leg loop.

4. The harness of claim 3 further comprising:
at least one rear link connecting the first leg loop to a back of the waist belt and the second leg loop to the back of the waist belt.

5. The harness of claim 3, wherein the first outer thigh end portion is shaped to extend away from the first knee when the first loop is receiving the first thigh.

6. The harness of claim 3, wherein the first thigh support band comprises a central portion between the first inner thigh end portion and the first outer thigh end portion, the central portion having a first centerline and wherein the first inner thigh end portion has a second centerline extending relative to the first centerline.

7. The harness of claim 6, wherein the first outer thigh end portion has a third centerline coextensive with the first centerline.

8. The harness of claim 6, wherein the second centerline extends in a first direction from the first centerline and wherein the first outer thigh end portion has a third centerline extending relative to the first centerline in a second direction, opposite from the first centerline.

9. The harness of claim 3 further comprising a top band extending between and interconnecting the outer thigh end portion and the inner thigh end portion.

10. The harness of claim 3, wherein the first thigh support band and the second thigh support band are each padded.

* * * * *